United States Patent
Salek et al.

(10) Patent No.: US 10,479,849 B2
(45) Date of Patent: Nov. 19, 2019

(54) LOW EMISSION PROPYLENE-BASED POLYMER RESINS

(71) Applicant: BRASKEM AMERICA, INC., Philadelphia, PA (US)

(72) Inventors: Jeffrey Salek, Pittsburgh, PA (US); Mark Chappell, Pittsburgh, PA (US); Bryan Dawson, Pittsburgh, PA (US)

(73) Assignee: BRASKEM AMERICA, INC., Philadelphia, PA (US)

( * ) Notice: Subject to any disclaimer, the term of this patent is extended or adjusted under 35 U.S.C. 154(b) by 0 days.

(21) Appl. No.: 15/341,461

(22) Filed: Nov. 2, 2016

(65) Prior Publication Data

US 2017/0121432 A1    May 4, 2017

Related U.S. Application Data

(60) Provisional application No. 62/249,465, filed on Nov. 2, 2015.

(51) Int. Cl.
*C08L 23/12* (2006.01)
*C08F 110/06* (2006.01)

(52) U.S. Cl.
CPC ........... *C08F 110/06* (2013.01); *C08L 23/12* (2013.01); *C08L 2205/025* (2013.01)

(58) Field of Classification Search
CPC .... C08L 23/12; C08L 23/16; C08L 2205/025; C08F 110/06
See application file for complete search history.

(56) References Cited

U.S. PATENT DOCUMENTS

| | | | |
|---|---|---|---|
| 8,344,069 B2 | 1/2013 | Gahleitner et al. | |
| 9,238,726 B2 | 1/2016 | Hama et al. | |
| 9,255,166 B2 | 2/2016 | Grein et al. | |
| 9,434,835 B2 | 9/2016 | Ter Woort et al. | |
| 9,527,989 B2 | 12/2016 | Herklots et al. | |
| 2003/0120001 A1* | 6/2003 | Canham et al. | C08F 10/00 526/64 |
| 2012/0322960 A1* | 12/2012 | Tian et al. | C08F 110/06 526/118 |
| 2012/0322961 A1* | 12/2012 | Rauscher et al. | C08F 10/00 526/118 |
| 2013/0288000 A1* | 10/2013 | Ishiwata et al. | C08J 5/18 428/141 |
| 2014/0128549 A1* | 5/2014 | Kheirandish et al. | C08L 23/10 525/240 |
| 2015/0057408 A1* | 2/2015 | Eckmayr et al. | C08L 23/10 524/528 |
| 2016/0114566 A1* | 4/2016 | Dupre et al. | B32B 7/02 156/60 |
| 2016/0289410 A1* | 10/2016 | Yamaguchi et al. | C08J 9/0061 |
| 2016/0289436 A1* | 10/2016 | Van Egmond et al. | C08L 23/12 |
| 2018/0298122 A1 | 10/2018 | Choi et al. | |

FOREIGN PATENT DOCUMENTS

| | | | | |
|---|---|---|---|---|
| EP | 3064514 A1 * | 9/2016 | | C08F 210/06 |
| WO | WO 2015/075054 A1 | 5/2015 | | |
| WO | WO 2015/100374 A2 | 7/2015 | | |
| WO | WO 2015/121160 A1 | 8/2015 | | |

OTHER PUBLICATIONS

"Controlling Polyolefin Properties by In-Reactor Blending:3. Mechanical Properties" Macromolecular Reaction Engineering vol. 7, Issue 7. pp. 328-343. https://onlinelibrary.wiley.com/doi/full/10.1002/mren.201200077.*
International Search Report for International Application No. PCT/US16/60051 dated Jan. 10, 2017.
Written Opinion of the International Searching Authority for International Application No. PCT/US16/60051 dated Jan. 10, 2017.
International Preliminary Report on Patentability for International Application No. PCT/US16/60051 dated May 8, 2018.

* cited by examiner

*Primary Examiner* — Nathan M Nutter
(74) *Attorney, Agent, or Firm* — K&L Gates LLP

(57) ABSTRACT

A propylene-based polymer resin is characterized by a low volatile emission signature. For example, the propylene-based polymer resin may have a volatile organic compound content no greater than 125 ppm, a semi-volatile organic compound content no greater than 500 ppm, and a C36 oligomeric content no greater than 250 ppm.

25 Claims, 1 Drawing Sheet

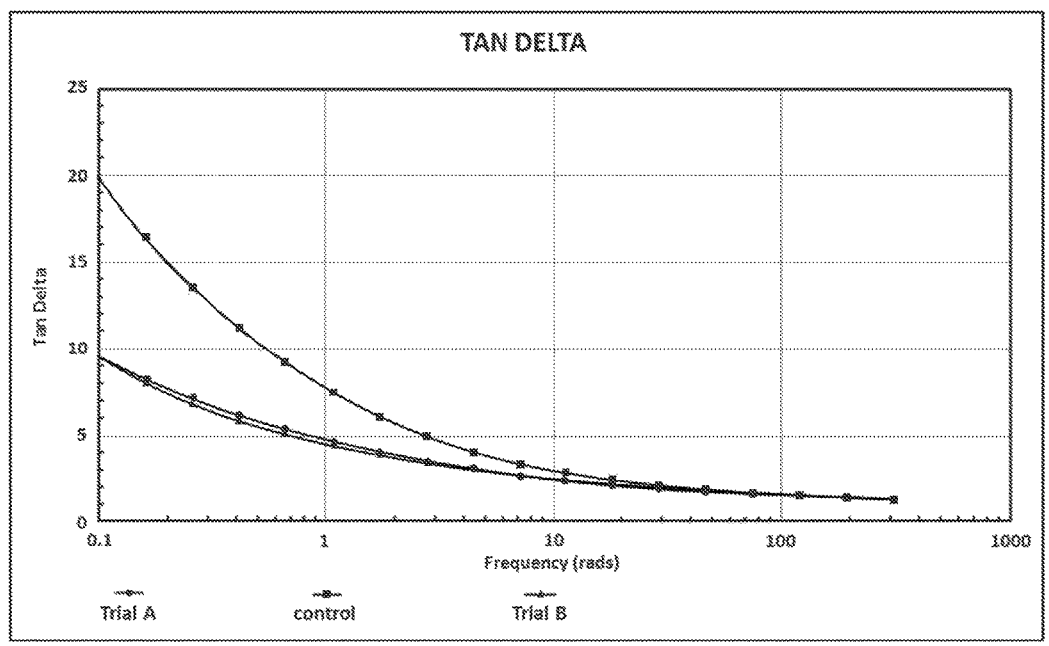

LOW EMISSION PROPYLENE-BASED POLYMER RESINS

CROSS-REFERENCE TO RELATED APPLICATIONS

This patent application claims priority under 35 U.S.C. § 119(e) to U.S. Provisional Patent Application No. 62/249,465, filed on Nov. 2, 2015. The content of U.S. Provisional Patent Application No. 62/249,465 is incorporated by reference into this patent application.

BACKGROUND

Synthetic polymeric materials such as propylene-based polymer resins are widely used in the production of bulk plastic materials. Bulk plastic materials comprising propylene-based polymer resins are used for the manufacture of a variety of end-use products such as molded, extruded, or thermoformed parts for automotive applications, for example, bumper fascia, instrument panel components, and other interior and exterior trim pieces.

SUMMARY

This specification describes propylene-based polymer resins with low volatile emission signatures. The propylene-based polymer resins are characterized by low volatile content, such as, for example, low volatile organic compound (VOC) content, low semi-volatile organic compound (SVOC) content, low C36 oligomeric content, and low condensable (FOG) content. The low volatile content of the propylene-based polymer resins is provided in-reactor and does not require downstream extractive processing such as heating and devolatilization, hot air purging, or steam purging.

The low emission propylene-based polymer resins described in this specification are also characterized by a high melt flow rate (low molten viscosity) and a high solid state crystallinity, which provide for good processability (e.g., in molding, extrusion, and forming processes). This specification also describes compositions and articles comprising the low emission propylene-based polymer resins, and processes for the production and use of the low emission propylene-based polymer resins.

In one example, a propylene-based polymer resin comprises a volatile organic compound content no greater than 125 ppm, a semi-volatile organic compound content no greater than 500 ppm, and a C36 oligomeric content no greater than 250 ppm.

In another example, a propylene-based polymer resin comprises a volatile organic compound content no greater than 125 ppm, a semi-volatile organic compound content no greater than 500 ppm, a C36 oligomeric content no greater than 250 ppm, a melt flow rate greater than 30 g/10 minutes, a crystallinity greater than 50%, and a mesopentad content greater than 92%.

In another example, a homopolymer polypropylene resin comprises a volatile organic compound content no greater than 125 ppm, a semi-volatile organic compound content no greater than 500 ppm, a C36 oligomeric content no greater than 250 ppm, a melt flow rate greater than 30 g/10 minutes, a crystallinity greater than 50%, and a mesopentad content greater than 92%.

It is understood that the inventions described in this specification are not limited to the examples summarized in this Summary.

BRIEF DESCRIPTION OF THE DRAWINGS

Various features and characteristics of the invention described in this specification may be better understood by reference to the accompanying FIGURE, in which:

The FIGURE is a graph of tan delta values as a function of loading frequency for inventive resins and conventional resins measured using Dynamic Mechanical Analysis.

The reader will appreciate the foregoing features and characteristics, as well as others, upon considering the following detailed description of the invention according to this specification.

DESCRIPTION

The following definitions and analytical methods are used in this specification:

The term "polymer" refers to a polymeric compound prepared by polymerizing monomers, whether of the same or a different type. The generic term "polymer" thus embraces the term "homopolymer," referring to polymers prepared from only one type of monomer; "copolymer," referring to polymers prepared from two or more different monomers; and blends of polymers, which are compositions comprising two or more polymers that have different monomeric contents and/or polymeric structures.

The term "propylene-based polymer" means polymer comprising greater than 50% by weight per molecule of monomeric units derived from propylene monomer. This includes polypropylene homopolymers or copolymers (meaning units derived from two or more comonomers), as well as blends of polymers where polypropylene homopolymer is the matrix phase of the blend.

The term "propylene-based polymer resin" means a macroscopic mass of material comprising a plurality of propylene-based polymer molecules, as opposed to the individual microscopic polymer molecules.

The term "alpha-olefin" or "α-olefin" includes alkenes having a carbon-carbon double bond between a first and second carbon atom in the molecule. Examples of alpha-olefins include, but are not limited to 1-butene, 1-pentene, 1-hexene, 1-heptene, 1-octene, 1-nonene, 1-decene, 1-undecene, and 1-dodecene, including combinations of any thereof.

The term "volatile organic compound content" or "VOC content" refers to the toluene equivalent content in a sample of material determined according to General Motors Engineering Standard GMW15634 (November 2014) (equivalent to German Association of the Automotive Industry (Verband der Automobilindustrie) Standard VDA-278 (October 2011)), which is incorporated-by-reference into this specification. Under this standard, VOC content is measured by a thermal desorption, dynamic headspace method in which a sample is heated at 90° C. and purged with inert gas for 30 minutes. The substances emitted during the 30 minute thermal desorption period are transferred to a gas chromatograph, where the emitted substances are collected in a cryogenic trap at −150° C. The substances collected in the cryogenic trap are injected into the gas chromatograph by heating to 280° C. The injected substances are separated by a capillary column in the gas chromatograph and detected by a mass spectrometer. The test measurements are calibrated against a toluene reference standard; therefore, the VOC content is reported in micro-grams of toluene equivalent per grams of sample (i.e., parts-per-million or ppm).

The term "semi-volatile organic compound content" or "SVOC content" refers to the n-hexadecane equivalent content in a sample of material determined according to General Motors Engineering Standard GMW15634 (November 2014) (equivalent to German Association of the Automotive Industry (Verband der Automobilindustrie) Standard VDA-278 (October 2011)), which is incorporated-by-reference into this specification. Under this standard, SVOC content is measured by a thermal desorption, dynamic headspace method in which a sample first undergoes the VOC measurement procedure described above. The sample is then heated at 120° C. and purged with inert gas for 60 minutes. The substances emitted during the 60 minute thermal desorption period are transferred to a gas chromatograph, where the emitted substances are collected in a cryogenic trap at −150° C. The substances collected in the cryogenic trap are injected into the gas chromatograph by heating to 280° C. The injected substances are separated by a capillary column in the gas chromatograph and detected by a mass spectrometer. The test measurements are calibrated against an n-hexadecane reference standard; therefore, the SVOC content is reported in micro-grams of n-hexadecane equivalent per grams of sample (i.e., parts-per-million or ppm).

The term "C36 oligomeric content" refers to polypropylene molecules having between 6 and 36 carbons in the polypropylene chain. C36 oligomeric content is assessed by extracting the polymer with methylene chloride, followed by analysis by gas chromatography. The analysis reports total oligomer content and a breakdown of isomeric oligomer content in C3 homolog groups beginning at C6 and ending at C36.

The term "condensable content" or "FOG content" refers to outgassed VOCs and SVOCs components of a polymer sample that condense on a cooler surface (such as a windshield, for example) and create a film on the surface (FOG) that can obstruct vision. FOG testing is performed by a method that recreates automotive interior out-gassing conditions in a timely, measurable, and repeatable manner, either gravimetrically or optically, under various standards including DIN, ISO and SAE.

The term "melt flow rate" or "MFR" refers to a measure of melt viscosity determined according to ASTM D1238-10 (230° C., 2.16 kg): *Standard Test Method for Melt Flow Rates of Thermoplastics by Extrusion Plastometer*, which is incorporated-by-reference into this specification. Melt flow rates are reported in units of grams-per-10-minutes (g/10 min.) or decigrams-per-minute (dg/min.).

The term "crystallinity" refers to the percentage crystallinity of a polymer sample measured using differential scanning calorimetry (DSC) according to the following equation:

$$\% \text{ crystallinity} = \frac{\Delta H_m - \Delta H_c}{\Delta H_m^0}(100);$$

wherein $\Delta H_m$ is the heat of melting determined via DSC measurement, $\Delta H_c$ is the heat of cold crystallization determined via DSC measurement, and $\Delta H_m^0$ is the heat of melting for a 100% crystalline polymer reference. For example, the $\Delta H_m^0$ value for 100% crystalline polypropylene homopolymer is 207.1 J/g, and the $\Delta H_m^0$ value for 100% crystalline polyethylene homopolymer is 293.6 J/g. The $\Delta H_m^0$ values for an propylene-ethylene copolymer can be determined from the values for the respective homopolymers using a linear rule of mixing based on the weight fraction (X) of each monomer type forming the copolymer:

$$\Delta H_{m(copolymer)}^0 = (207.1 \text{ J/g})(X_{ethylene}) + (293.6 \text{ J/g})(X_{propylene})$$

The term "mesopentad" refers to five successive methyl groups located on the same side of the plane of the carbon-carbon chain in a propylene polymer molecule (mmmm, wherein "m" represents a meso dyad, i.e., two successive methyl groups located on the same side of the plane of the carbon-carbon chain). The term "mesopentad content" refers to the percentage of mesopentad units (mmmm) in propylene polymer resins as measured from signals of methyl groups in $^{13}$C-NMR spectra according to the method described in Zambelli et al., *Macromolecules*, 6, 925 (1973), wherein the measurement of $^{13}$C-NMR spectra is conducted according to the peak attribution method described in Zambelli et al., *Macromolecules*, 8, 687 (1975) (both references are incorporated-by-reference into this specification). A mesopentad content of 100% corresponds to a completely isotactic polymer resin and the closer the mesopentad content is to 100%, the higher the stereoregularity (i.e., isotacticity) of the polymer resin.

The term "in-reactor," when used to describe a polymer resin, refers to the condition of the polymer resin as-produced in a reactor, and before or without any subsequent processing to modify the subject resin properties. For example, the VOC content, SVOC content, and/or oligomer content of an "in-reactor propylene-based polymer resin" is the respective content of the resin before or without any post-production hot air purging, steam purging, or other post-production treatments to reduce volatile content.

The term "tan delta" (also known as "tangent delta" or "damping coefficient") refers to the tangent of the phase angle (i.e., the delay (phase lag) between applied force and material response) in Dynamic Mechanical Analyses (DMA). Tan delta can be calculated as the ratio of viscous (loss) modulus (G") to elastic (storage) modulus (G') measured using DMA in accordance with ASTM D4440-15: *Standard Test Method for Plastics: Dynamic Mechanical Properties Melt Rheology* and ASTM D4065-12: *Standard Practice for Plastics: Dynamic Mechanical Properties: Determination and Report of Procedures*, which are incorporated-by-reference into this specification. Tan delta is a useful quantifier of the viscoelasticity of a polymer resin and the dissipation of energy in the material under cyclic loading.

In automotive applications, for example, industry trends favor overall vehicle weight reduction by reducing the mass of plastic vehicle components, among other approaches. The reduction of the mass of plastic vehicle components is generally achieved by decreasing the wall thickness of plastic parts. This is so because the other part dimensions (length and width) are typically set by vehicle design requirements and, therefore, cannot be decreased in order to reduce part mass.

The production of thin-walled plastic parts—using injection molding, for example—requires that the constituent polymer resins have a sufficiently low viscosity so that the molten resins can readily flow and uniformly fill mold cavities without excessive injection pressures. From a polymer design perspective, decreasing the melt viscosity of a polymer resin requires decreasing the molecular weight of the constituent polymer molecules forming the resin. However, producing polymer resins containing lower molecular weight molecules increases the volatile organic compound (VOC), semi-volatile organic compound/condensable (SVOC/FOG) and, C36 oligomeric content of the resin.

Thus, while decreasing the molecular weight of polymer molecules decreases the melt viscosity of a polymer resin and provides for improved melt processability, it also increases the VOC, SVOC/FOG, and oligomer content of the resin. Increased VOC, SVOC/FOG, and oligomer content are undesirable from an environmental health and safety perspective. Prior approaches to balancing the trade-off between the melt processability and the VOC, SVOC/FOG, and oligomer content of polymer resins involved the use of downstream, post-production treatment operations to extract volatile compounds from bulk plastic resin materials (e.g., pellets). For example, steam purging is an operation in which resin pellets are treated by contact with flowing steam at atmospheric pressure (100° C.) for a period of time, followed by contact with flowing air, to heat the resin material, volatilize and extract VOCs, SVOCs, and oligomers from the resin material, and cool/dry the treated resin material. Similarly, hot air purging is an operation in which resin pellets are treated by contact with a large volume of flowing hot air (e.g., 80° C.) for a period of time to heat the resin material and volatilize and extract VOCs, SVOCs, and oligomers.

Post-production treatments like steam purging and hot air purging increase the production cost for low-volatile polymer resin grades, making such grades more expensive to produce, purchase, and use, notwithstanding their desirability from an environmental health and safety perspective. It would be advantageous to produce polymer resins that simultaneously provide good melt processability and low volatile content without the need for any post-production, volatile-reduction treatments. The inventions described in this specification relate to propylene-based polymer resins having low melt viscosity, while also simultaneously having a low volatile emission signature, produced in-reactor and without the use of any post-production treatments to reduce volatile content.

The propylene-based polymer resins comprise a VOC content no greater than 125 ppm, a SVOC content no greater than 500 ppm, and a C36 oligomeric content no greater than 250 ppm.

The propylene-based polymer resins may comprise a VOC content no greater than 125 ppm, no greater than 120 ppm, no greater than 115 ppm, or no greater than 110 ppm. The propylene-based polymer resins may comprise a SVOC content no greater than 500 ppm, no greater than 400 ppm, no greater than 300 ppm, no greater than 250 ppm, no greater than 225 ppm, no greater than 200 ppm, or no greater than 175 ppm. The propylene-based polymer resins may comprise a C36 oligomeric content no greater than 250 ppm, no greater than 245 ppm, no greater than 235 ppm, no greater than 225 ppm, or no greater than 220 ppm.

In addition to the VOC content, SVOC content, and C36 oligomeric content, the propylene-based polymer resin may also comprise a melt flow rate greater than 30 g/10 minutes, a crystallinity greater than 50%, and a mesopentad content greater than 92%.

The propylene-based polymer resins may comprise a melt flow rate greater than 30 g/10 min., greater than 50 g/10 min., greater than 75 g/10 min., greater than 85 g/10 min., greater than 95 g/10 min., greater than 100 g/10 min., greater than 105 g/10 min., greater than 110 g/10 min., or greater than 115 g/10 min. The propylene-based polymer resins may comprise a crystallinity greater than 50%, greater than 55%, greater than 60%, or greater than 65%. The propylene-based polymer resins may comprise a mesopentad content greater than 92%, greater than 93%, greater than 93.5%, greater than 94%, greater than 94.5%, greater than 95%, greater than 95.5%, greater than 96%, greater than 96.5%, greater than 97%, greater than 97.5%, or greater than 98.0%.

The propylene-based polymer resin may be characterized by any combination of the above-described properties and characterizing parameters, including any combination or sub-combination of VOC content ($\leq$125 ppm), SVOC content ($\leq$500 ppm), C36 oligomeric content ($\leq$250 ppm), melt flow rate ($\geq$30 g/10 min.), crystallinity ($\geq$50%), and/or mesopentad content ($\geq$92.0%). The propylene-based polymer resin may be characterized by any combination or sub-combination of the above-described material properties and characterizing parameters at the specified threshold values or any greater or lesser subsumed threshold values, as applicable.

The combination of low VOC content, low SVOC content, low C36 oligomeric content, low FOG content, high melt flow rate, high crystallinity, and/or high mesopentad content is achieved in-reactor and does not require the use of any post-production treatments to reduce volatile content. Thus, the propylene-based polymer resin may comprise an in-reactor propylene-based polymer resin characterized by any combination of the above-described properties and characterizing parameters.

The propylene-based polymer resin may comprise a homopolymer polypropylene. The propylene-based polymer resin may comprise a propylene-ethylene copolymer. The propylene-based polymer resin may comprise a propylene-alpha olefin copolymer. For example, the propylene-based polymer resin may be produced from propylene monomers and, optionally, ethylene and/or one or more alpha-olefin monomers, such as, for example, 1-butene, 1-pentene, 1-hexene, 1-heptene, 1-octene, 1-nonene, 1-decene, 1-undecene, and/or 1-dodecene. Propylene-based polymer resins comprising polymers comprising one or more alpha olefin comonomers may comprise any combination of one or more alpha olefin comonomers selected from the group consisting of 1-butene, 1-pentene, 1-hexene, 1-heptene, 1-octene, 1-nonene, 1-decene, 1-undecene, and 1-dodecene. In embodiments wherein the propylene-based polymer resin comprises a propylene-ethylene copolymer or a propylene-alpha olefin copolymer, the copolymer may comprise from 60% to 99% propylene monomer, and from 1% to 40% ethylene and/or alpha olefin monomer, by weight based on the total comonomer weight of the copolymer.

The propylene-based polymer resin may comprise combinations of homopolymer polypropylene, propylene-ethylene copolymer, and/or propylene-alpha olefin copolymer. In examples comprising two or more types of polymers (e.g., a polypropylene homopolymer and a propylene-ethylene copolymer), the propylene-based polymer resin may be produced by melt compounding the individual polymer components (e.g., in a twin-screw extruder). Alternatively, a resin comprising two or more types of polymers (e.g., a polypropylene homopolymer and a propylene-ethylene copolymer) may be made using an in-reactor blending process, which may be accomplished by polymerizing the monomer(s) (propylene, for example) of a first polymer component in a first reactor in the presence of a polymerization catalyst and transferring the resulting polymer component from the first reactor into a second reactor (or changing the feed to a single reactor in a batch-type process, for example) where the monomers comprising a second polymer component are polymerized in the presence of the first polymer component, thus producing an in-reactor blend.

The propylene-based polymer resin described above may be incorporated into an impact copolymer polypropylene (ICP) composition. The ICP composition may comprise a rubber phase and a matrix phase. The matrix phase may comprise the propylene-based polymer resin described above. The rubber phase, which is dispersed in the matrix phase, may comprise a propylene-ethylene copolymer and/or a propylene-alpha olefin copolymer.

The dispersed rubber phase of the ICP composition may comprise from 5% to 50%, and the matrix phase may comprise from 50% to 95%, of the ICP composition by weight based on the combined weight of the rubber phase and the matrix phase. The dispersed rubber phase may comprise from 5% to 50% of the ICP composition based on the combined weight of the rubber phase and the matrix phase, or any sub-range subsumed therein, such as, for example, 5-40%, 5-30%, 5-25%, 5-20%, or 5-15%. The matrix phase may comprise from 50% to 95%, of the ICP composition based on the combined weight of the rubber phase and the matrix phase, or any sub-range subsumed therein, such as, for example, 60-95%, 70-95%, 75-95%, 80-95%, or 85-95%.

The rubber phase may be combined with and dispersed in the matrix phase in-reactor (e.g., synthesized in two continuous-flow reactors connected in series, or sequentially synthesized in a batch reactor) or by melt blending the polymers comprising the phases. The matrix phase and/or the dispersed rubber phase of the ICP composition may independently comprise one or more individual polymers. Accordingly, the rubber phase, the matrix phase, or both phases may themselves be sub-blends (whether in-reactor or post-reactor blends) of different polymers such as homopolymer polypropylene, propylene-ethylene copolymer, and/or propylene-alpha olefin copolymer.

The dispersed rubber phase of the ICP composition may comprise a propylene-ethylene copolymer. The propylene-ethylene copolymer may comprise from 25% to 95% ethylene monomer, and from 5% to 75% propylene monomer, by weight based on the total comonomer weight of the propylene-ethylene copolymer. The propylene-ethylene copolymer may comprise from 25% to 95% ethylene monomer by weight based on the total comonomer weight of the propylene-ethylene copolymer, or any sub-range subsumed therein, such as, for example, 50-90%, 50-80%, 50-75%, or 55-70%. The propylene-ethylene copolymer may comprise from 5% to 75% propylene monomer by weight based on the total comonomer weight of the propylene-ethylene copolymer, or any sub-range subsumed therein, such as, for example, 10-50%, 20-50%, 25-50%, or 30-45%.

Examples of other polymers suitable for the dispersed rubber phase of the ICP composition are described in U.S. Patent Application Publication Nos. 2014-0194577 A1; 2012-0157599 A1; and 2014-0107274 A1, which are incorporated-by-reference into this specification.

The propylene-based polymer resin described above may be produced using a gas phase polymerization process. For example, propylene monomer reactant (with optional ethylene or alpha-olefin comonomer reactants) may be fed into a fluidized bed reactor where the reactants contact a polymerization catalyst, such as, for example, a Ziegler-Natta polymerization catalyst. Suitable Ziegler-Natta polymerization catalysts include non-metallocene Ziegler-Natta catalysts, homogeneous or heterogeneous Ziegler-Natta catalysts, and supported Ziegler-Natta catalysts, and including any necessary co-catalysts. Suitable catalysts include Ziegler-Natta catalyst systems for use in UNIPOL® type polymerization processes, for example.

The propylene-based polymer resin compositions described in this specification may exhibit improved properties compared to conventional resins. For example, the propylene-based polymer resin compositions may have a unique, differentiated rheological response at low angular frequencies, resulting in increased elasticity at these frequencies. For example, the propylene-based polymer resin compositions according to certain embodiments described herein may display increased storage modulus (G') at low angular frequencies compared to conventional propylene-based polymer resin compositions. In specific embodiments, the propylene-based polymer resin compositions may have a tan delta of less than about 10.0 at an angular frequency of 0.1 rad/s (180° C.).

As described above, ICP compositions comprising the propylene-based polymer resin (as a matrix phase, for example) may be produced by melt compounding the individual polymer components, but may alternatively be produced using an in-reactor process. For example, propylene monomer (and any optional ethylene or alpha-olefin comonomer) may be polymerized in a first fluidized bed gas phase reactor, in the presence of a polymerization catalyst, to form the propylene-based polymer resin matrix phase. The propylene-based polymer resin may be transferred from the first reactor into a second reactor where propylene monomer and ethylene monomer and/or alpha-olefin monomer are polymerized in the presence of the matrix phase to form a rubber phase that disperses in the matrix phase in situ. The polymerization catalyst used in each reactor may be the same catalyst (i.e., the polymerization catalyst may be transferred from the first reactor to the second reactor along with the polymer material produced in the first reactor).

The propylene-based polymer resin or ICP composition produced in a production reactor or reactors may be blended with various other optional components including other polymers. For example, a variety of additives may optionally be incorporated for various purposes into the propylene-based polymer resin or ICP composition. Such additives include, for example, antioxidants (e.g., hindered phenols such as Irganox™ 1010, available from the BASF Corporation, and phosphites such as Irgafos™ 168, available from the BASF Corporation), acid scavengers (e.g., calcium stearate), nucleating agents (e.g., NA-11 from Amfine Corporation), fillers (e.g., talc), and antistatic agents/lubricants (e.g., glyceryl monostearate). Additional additives include, for example, optical brighteners, stabilizers, cling additives (e.g., polyisobutylene), polymeric processing aids (e.g., Dynamar™5911, available from 3M Corporation, or Silquest™ PA-1, available from Momentive Performance Materials), colorants, clarifiers (e.g., Millad 3988i and Millad NX8000, available from Milliken & Co.), antiblock agents, waxes, antimicrobials, and UV stabilizers. Additives may be blended with the propylene-based polymer resin or ICP composition by co-extrusion, for example, using a twin-screw extruder.

The propylene-based polymer resin or ICP composition, with or without optional additives, may be used in various applications. For example, the propylene-based polymer resin or ICP composition may be used to form molded articles. Molded articles comprising the propylene-based polymer resin or ICP composition include, for example, injection molded automotive parts.

EXAMPLES

Example 1

A first inventive propylene-based polymer resin comprising homopolymer polypropylene was pelletized (Trial A). A second inventive propylene-based polymer resin comprising homopolymer polypropylene was pelletized (Trial B). The following characteristics of the pelletized resin were measured: VOC content (German Association of the Automotive Industry Standard VDA-277, which is incorporated-by-reference into this specification); VOC content (GMW15634/VDA-278); SVOC content; C36 oligomeric content; melt flow rate; crystallinity; mesopentad content; and molecular weight. The inventive in-reactor pelletized resins were compared to a conventional pelletized resin as a control. The results are shown in Table 1.

TABLE 1

| Property | Control Resin Pellets | Resin Pellets (Trial A) | Resin Pellets (Trial B) |
|---|---|---|---|
| VOC content (VDA-277) (ppm) | 243 | 326 | 227 |
| VOC content (GMW15634/VDA-278) (ppm) | 157 | 111 | 84 |
| SVOC content (GMW15634/VDA-278) (ppm) | 905 | 478 | 308 |
| C36 oligomeric content (ppm) | 294 | 219 | 158 |
| MFR (g/10 min.) | 115 | 118 | 116 |
| crystallinity (%) | 68.2 | 69.1 | 73.6 |
| mesopentad content (%) | 97.36 | 97.56 | 97.48 |
| number average molecular weight ($M_n$) | 35,000 | 26,000 | 25,500 |
| weight average molecular weight ($M_n$) | 191,500 | 144,000 | 144,500 |
| polydispersity ($M_w/M_n$) | 5.25 | 5.54 | 5.67 |
| Z average molecular weight ($M_z$) | 560,500 | 486,500 | 518,000 |
| Z + 1 average molecular weight ($M_{z+1}$) | 1,111,500 | 1,009,500 | 1,129,500 |

DMA was used to measure tan delta as a function of loading frequency for the conventional resin and the inventive resins. The tan delta values are shown in the FIGURE. The resins all exhibited similar viscosity flow behavior as indicated by the similarly shaped curves shown in the FIGURE. The inventive resins exhibited smaller tan delta values than the conventional resin, particularly under low frequency loading conditions, which indicates better melt elasticity properties. The decrease tan delta values with increasing loading frequency is a good indicator of melt elasticity properties that stabilize melt flow fronts in injection molding, which improves the aesthetics of molded articles, particularly molded articles having long dimensions that the flow front of a polymer melt must traverse in order to form the part shape.

ASPECTS OF THE INVENTION

Various aspect, features, and characteristics of the invention include, but are not limited to, the following numbered clauses.

1. A propylene-based polymer resin comprising: a volatile organic compound content no greater than 125 ppm; a semi-volatile organic compound content no greater than 500 ppm; and a C36 oligomeric content no greater than 250 ppm.

2. The propylene-based polymer resin of clause 1, wherein the resin has a tan delta of less than 10.0 at an angular frequency of 0.1 rad/s (180° C.).

3. The propylene-based polymer resin of clause 1 or clause 2, wherein the volatile organic compound content is no greater than 120 ppm.

4. The propylene-based polymer resin of any one of clauses 1-3, wherein the volatile organic compound content is no greater than 115 ppm.

5. The propylene-based polymer resin of any one of clauses 1-4, wherein the semi-volatile organic compound content is no greater than 200 ppm.

6. The propylene-based polymer resin of any one of clauses 1-5, wherein the semi-volatile organic compound content is no greater than 175 ppm.

7. The propylene-based polymer resin of any one of clauses 1-6, wherein the C36 oligomeric content is no greater than 235 ppm.

8. The propylene-based polymer resin of any one of clauses 1-7, wherein the C36 oligomeric content is no greater than 220 ppm.

9. The propylene-based polymer resin of any one of clauses 1-8, wherein the resin comprises a melt flow rate greater than 30 g/10 min.

10. The propylene-based polymer resin of any one of clauses 1-9, wherein the resin comprises a melt flow rate is greater than 75 g/10 min.

11. The propylene-based polymer resin of any one of clauses 1-10, wherein the resin comprises a melt flow rate is greater than 100 g/10 min.

12. The propylene-based polymer resin of any one of clauses 1-11, wherein the resin comprises a melt flow rate is greater than 115 g/10 min.

13. The propylene-based polymer resin of any one of clauses 1-12, wherein the resin comprises a crystallinity greater than 50%.

14. The propylene-based polymer resin of any one of clauses 1-13, wherein the resin comprises a crystallinity greater than 60%.

15. The propylene-based polymer resin of any one of clauses 1-14, wherein the resin comprises a crystallinity greater than 65%.

16. The propylene-based polymer resin of any one of clauses 1-15, wherein the resin comprises a mesopentad content greater than 92%.

17. The propylene-based polymer resin of any one of clauses 1-16, wherein the resin comprises a mesopentad content greater than 95%.

18. The propylene-based polymer resin of any one of clauses 1-17, wherein the resin comprises a mesopentad content greater than 97%.

19. The propylene-based polymer resin of any one of clauses 1-18, wherein the resin comprises a homopolymer polypropylene.

20. The propylene-based polymer resin of any one of clauses 1-18, wherein the resin comprises a propylene-ethylene copolymer.

21. The propylene-based polymer resin of any one of clauses 1-18, wherein the resin comprises a propylene-alpha olefin copolymer.

22. The propylene-based polymer resin of clause 21, wherein the alpha olefin comprises at least one monomer selected from the group consisting of 1-butene, 1-pentene, 1-hexene, 1-heptene, 1-octene, 1-nonene, 1-decene, 1-undecene, 1-dodecene, and combinations of any thereof.

23. The propylene-based polymer resin of any one of clauses 1-22, wherein the resin is an in-reactor resin.

24. An impact copolymer polypropylene composition comprising: a rubber phase comprising a propylene-ethylene copolymer; and a matrix phase comprising the propylene-based polymer resin of any one of clauses 1-23.

25. A molded article comprising the propylene-based polymer resin of any one of clauses 1-22 or the impact copolymer polypropylene composition of clause 23.

26. A propylene-based polymer resin comprising: a volatile organic compound content no greater than 125 ppm; a semi-volatile organic compound content no greater than 500 ppm; a C36 oligomeric content no greater than 250 ppm; a melt flow rate greater than 30 g/10 min.; a crystallinity greater than 50%; and a mesopentad content greater than 92%.

27. The propylene-based polymer resin of clause 26, wherein the resin is an in-reactor resin.

28. An impact copolymer propylene composition comprising: a rubber phase comprising a propylene-ethylene copolymer; and a matrix phase comprising the propylene-based polymer resin of clause 26 or clause 27.

29. A molded article comprising the propylene-based polymer resin of clause 26 or clause 27, or the impact copolymer polypropylene composition of clause 28.

30. A homopolymer polypropylene resin comprising: a volatile organic compound content no greater than 125 ppm; a semi-volatile organic compound content no greater than 500 ppm; a C36 oligomeric content no greater than 250 ppm; a melt flow rate greater than 30 g/10 min.; a crystallinity greater than 50%; and a mesopentad content greater than 92%.

31. The homopolymer polypropylene resin of clause 30, wherein the resin is an in-reactor resin.

32. An impact copolymer polypropylene composition comprising: a rubber phase comprising a propylene-ethylene copolymer; and a matrix phase comprising the homopolymer polypropylene resin of clause 30 or clause 31.

33. A molded article comprising the homopolymer polypropylene resin of clause 30 or clause 31, or the impact copolymer polypropylene composition of clause 32.

Various features and characteristics of the invention are described in this specification to provide an overall understanding of the production and properties of the disclosed compositions and products. It is understood that the various features and characteristics described in this specification can be combined in any manner regardless of whether such features and characteristics are expressly described in combination in this specification. The Applicant expressly intends such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will comply with written description and sufficiency of description requirements, and will not add new matter to the specification or claims. The compositions, products, processes, and methods disclosed in this specification can comprise, consist of, or consist essentially of the various features and characteristics described in this specification.

Also, any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description and sufficiency of description requirements, and will not add new matter to the specification or claims. Additionally, numerical parameters described in this specification should be construed in light of the number of reported significant digits, the numerical precision of the number, and by applying ordinary rounding techniques. It is also understood that numerical parameters described in this specification will necessarily possess the inherent variability characteristic of the underlying measurement techniques used to determine the numerical value of the parameter.

Any patent, publication, or other disclosure material identified in this specification is incorporated by reference into this specification in its entirety unless otherwise indicated, but only to the extent that the incorporated material does not conflict with existing descriptions, definitions, statements, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

What is claimed is:

1. A propylene-based polymer resin comprising:
   a volatile organic compound content no greater than 125 ppm;
   a semi-volatile organic compound content no greater than 500 ppm; and
   a C36 oligomeric content no greater than 250 ppm, wherein the propylene-based polymer resin is produced utilizing a Ziegler-Natta catalyst.

2. The propylene-based polymer resin of claim 1, wherein the resin has a tan delta of less than 10.0 at an angular frequency of 0.1 rad/s (180° C.).

3. The propylene-based polymer resin of claim 1, wherein the volatile organic compound content is no greater than 115 ppm.

4. The propylene-based polymer resin of claim 1, wherein the semi-volatile organic compound content is no greater than 175 ppm.

5. The propylene-based polymer resin of claim 1, wherein the C36 oligomeric content is no greater than 220 ppm.

6. The propylene-based polymer resin of claim 1, wherein the resin comprises a melt flow rate greater than 115 g/10 min.

7. The propylene-based polymer resin of claim 1, wherein the resin comprises a crystallinity greater than 65%.

8. The propylene-based polymer resin of claim 1, wherein the resin comprises a mesopentad content greater than 97%.

9. The propylene-based polymer resin of claim 1, wherein the resin comprises a homopolymer polypropylene.

10. The propylene-based polymer resin of claim 1, wherein the resin comprises a propylene-ethylene copolymer.

11. The propylene-based polymer resin of claim 1, wherein the resin comprises a propylene-alpha olefin copolymer.

12. The propylene-based polymer resin of claim 11, wherein the alpha olefin comprises at least one monomer selected from the group consisting of 1-butene, 1-pentene, 1-hexene, 1-heptene, 1-octene, 1-nonene, 1-decene, 1-undecene, 1-dodecene, and combinations of any thereof.

13. The propylene-based polymer resin of claim 1, wherein the resin is an in-reactor resin.

14. An impact copolymer polypropylene composition comprising:
   a rubber phase comprising a propylene-ethylene copolymer; and
   a matrix phase comprising the propylene-based polymer resin of claim 1.

15. A molded article comprising the propylene-based polymer resin of claim 1.

16. A propylene-based polymer resin comprising:
   a volatile organic compound content no greater than 125 ppm;
   a semi-volatile organic compound content no greater than 500 ppm;
   a C36 oligomeric content no greater than 250 ppm;
   a melt flow rate greater than 30 g/10 min.;
   a Mw/Mn of greater than 5;
   a crystallinity greater than 50%; and
   a mesopentad content greater than 92%, wherein the propylene-based polymer resin is produced utilizing a Zeigler-Natta catalyst.

17. The propylene-based polymer resin of claim 16, wherein the resin is an in-reactor resin.

18. An impact copolymer propylene composition comprising:
   a rubber phase comprising a propylene-ethylene copolymer; and
   a matrix phase comprising the propylene-based polymer resin of claim 16.

19. A molded article comprising the propylene-based polymer resin of claim 16.

20. A homopolymer polypropylene resin comprising:
   a volatile organic compound content no greater than 125 ppm;
   a semi-volatile organic compound content no greater than 500 ppm;
   a C36 oligomeric content no greater than 250 ppm;
   a melt flow rate greater than 30 g/10 min.;
   a crystallinity greater than 50%; and
   a mesopentad content greater than 92%, wherein the propylene-based polymer resin is produced utilizing a Zeigler-Natta catalyst.

21. The homopolymer polypropylene resin of claim 20, wherein the resin is an in-reactor resin.

22. An impact copolymer polypropylene composition comprising:
   a rubber phase comprising a propylene-ethylene copolymer; and
   a matrix phase comprising the homopolymer polypropylene resin of claim 20.

23. A molded article comprising the homopolymer polypropylene resin of claim 20.

24. The propylene-based polymer resin of claim 1, wherein the resin has a Mw/Mn of greater than 5.

25. The propylene-based polymer resin of claim 1, wherein the Zeigler-Natta catalyst is a non-metallocene Zeigler-Natta catalyst.

* * * * *